United States Patent [19]

Melegari

[11] Patent Number: 5,624,209
[45] Date of Patent: Apr. 29, 1997

[54] LAND RECLAMATION METHOD AND EQUIPMENT INVOLVING THE INTRODUCTION AND MIXING OF A FLUID AND SUBSTANCES DISPERSED IN AIR

[76] Inventor: Cesare Melegari, P.za Garibaldi, 11, I-43052 Colorno (PR), Italy

[21] Appl. No.: 549,881

[22] Filed: Oct. 30, 1995

[30] Foreign Application Priority Data

Jul. 13, 1995 [IT] Italy .................. PC95A0015

[51] Int. Cl.$^6$ .................................................. E02D 3/12
[52] U.S. Cl. .................. 405/269; 405/263; 405/266
[58] Field of Search .................. 405/269, 267, 405/263, 232–243

[56] References Cited

U.S. PATENT DOCUMENTS

| | | | |
|---|---|---|---|
| 4,606,675 | 8/1986 | Mitani et al. | 405/269 X |
| 4,624,606 | 11/1986 | Nakanishi et al. | 405/269 |
| 4,659,259 | 4/1987 | Reed et al. | 405/269 X |
| 4,786,212 | 11/1988 | Bauer et al. | 405/269 |
| 4,971,480 | 11/1990 | Nakanishi | 405/269 |
| 5,006,017 | 4/1991 | Yoshida et al. | 405/269 X |
| 5,217,327 | 6/1993 | Nakanishi | 405/269 |
| 5,228,809 | 7/1993 | Yoshida et al. | 405/269 |

*Primary Examiner*—Dennis L. Taylor
*Attorney, Agent, or Firm*—Notaro & Michalos P.C.

[57] ABSTRACT

A soil decontamination method uses a drilling rod having an outer pipe with a closed lower end and a radially extending outlet nozzle near the lower end. The outer pipe has an outer surface which is free of structures so that the outer pipe moves smoothly in a hole. An inner pipe is co-axially positioned in the outer pipe, the inner pipe having a lower closed end with a radially extending nozzle which is co-axial with, and spaced inwardly from the nozzle of the outer pipe. A drill bit is on an outer surface of a lower end of the outer pipe. A hole is drilled into a layer of soil using the bit. With the bit in the hole, a dry mixture of air and solid aggregate particles under relatively low pressure are supplied into a space between the outer and inner pipes and a high pressure fluid is supplied into the inner pipe under a relatively high pressure, the high pressure fluid leaving the nozzle of the inner pipe and taking with it some of the dry mixture which passes out of the outer pipe through the nozzle of the outer pipe to disaggregate and mix with and decontaminate soil of the layer around the hole.

12 Claims, 2 Drawing Sheets

LAND RECLAMATION METHOD AND EQUIPMENT INVOLVING THE INTRODUCTION AND MIXING OF A FLUID AND SUBSTANCES DISPERSED IN AIR

FIELD AND BACKGROUND OF THE INVENTION

This invention relates to a land reclamation method which involves the introduction and mixing of a fluid and substances dispersed in air, and the related equipment.

In accordance with the method invented, the land is drilled to the required depth with a probe fitted with at least one radial nozzle, a pipe which supplies the said nozzle with a very high pressure fluid, and a second pipe through which a dry substance mixed with air is conveyed, forced out by the said high pressure fluid, and mixed with the soil.

The said pipes are preferably coaxial, and the high-pressure fluid is conveyed through the inner pipe.

Due to the high speed at which the mixture exits from the probe nozzle, a disintegration and mixing effect is produced which causes the substances required for the treatment to be evenly dispersed in the subsoil layers; as a result, the soil is only treated at the required depth.

The invention is particularly suitable for the reclamation of contaminated soil.

The invention falls into the category of technologies applied to land reclamation, especially for treatment of subsoil layers designed to decontaminate or compact soil so as to create a layer with specific characteristics, such as a given degree of impermeability or the like.

Using the method in accordance with the invention, it is possible to inject into soil, or masses of refuse, substances which, by means of physical action (cementation) or chemical action, can stabilise the mass so that it no longer represents a potential danger.

Cases of land pollution are increasingly frequent, especially close to certain factories or sites used as tips for long periods.

The substances which percolate through the soil and are absorbed and dispersed in the subsoil layers often represent a serious source of pollution, creating problems that are very difficult to solve.

The equipment currently used to reclaim this type of land consists of large helicoid screws fixed to the ends of rods which are inserted into the soil and rotated to mix the soil with substances introduced during the advance of the unit.

This is obviously a very expensive system, whose efficacy is debatable.

For example, with this system it is impossible to treat only one layer of subsoil, e.g. to create an impermeable barrier or to decontaminate a specific layer only.

The method does not allow the areas treated to be vertically isolated so that the treatment only affects one layer of subsoil; the surface soil also has to be mixed, involving a considerable waste of time and energy as well as high costs.

These known methods also present the drawback that they require very high power to mix the deeper soil; large equipment therefore has to be used, but the results can hardly be considered perfect, especially as these helicoids rotate at low speeds because they have to mix huge amounts of soil.

In practice, using known reclamation methods it is impossible to treat a specific layer of subsoil; the whole depth has to be treated because the screw blades obviously have to penetrate all the soil layers, starting from ground level, to reach the zone in question.

SUMMARY OF THE INVENTION

To obviate this problem, this invention proposes a method (and the associated equipment) whereby the soil is drilled with a probe (using a similar system to the jet-grouting technique) and a fluid is injected at very high pressure and speed (approx. 200–250 meters/sec.) through a radial nozzle; at the same time, substances mixed with a gas such as air are conveyed, sucked out by the fluid when it exits from the probe, and evenly distributed in the surrounding soil.

Techniques involving the injection of high-pressure fluids through a probe with radial nozzles are already known; see, for example, Italian patent application PC92A000002, which relates to a method of constructing consolidated cement columns in the soil into which a high-pressure cement grout (approx. 500 bars) is injected and grout or shotcrete is simultaneously injected at a lower pressure (approx. 20 bars).

The injection is performed through a probe with coaxial radial nozzles.

However, this method is only designed for the mechanical consolidation of land, and no suggestion is made in that application about the possibility of reclaiming land by injecting a high-pressure fluid or liquid mixture and simultaneously injecting gas mixed with liquid or solid substances.

BRIEF DESCRIPTION OF THE DRAWINGS

This invention will now be described in detail, by way of example but not of limitation, by reference to the annexed figures in which.

DESCRIPTION OF THE PREFERRED EMBODIMENTS

Figure 1:
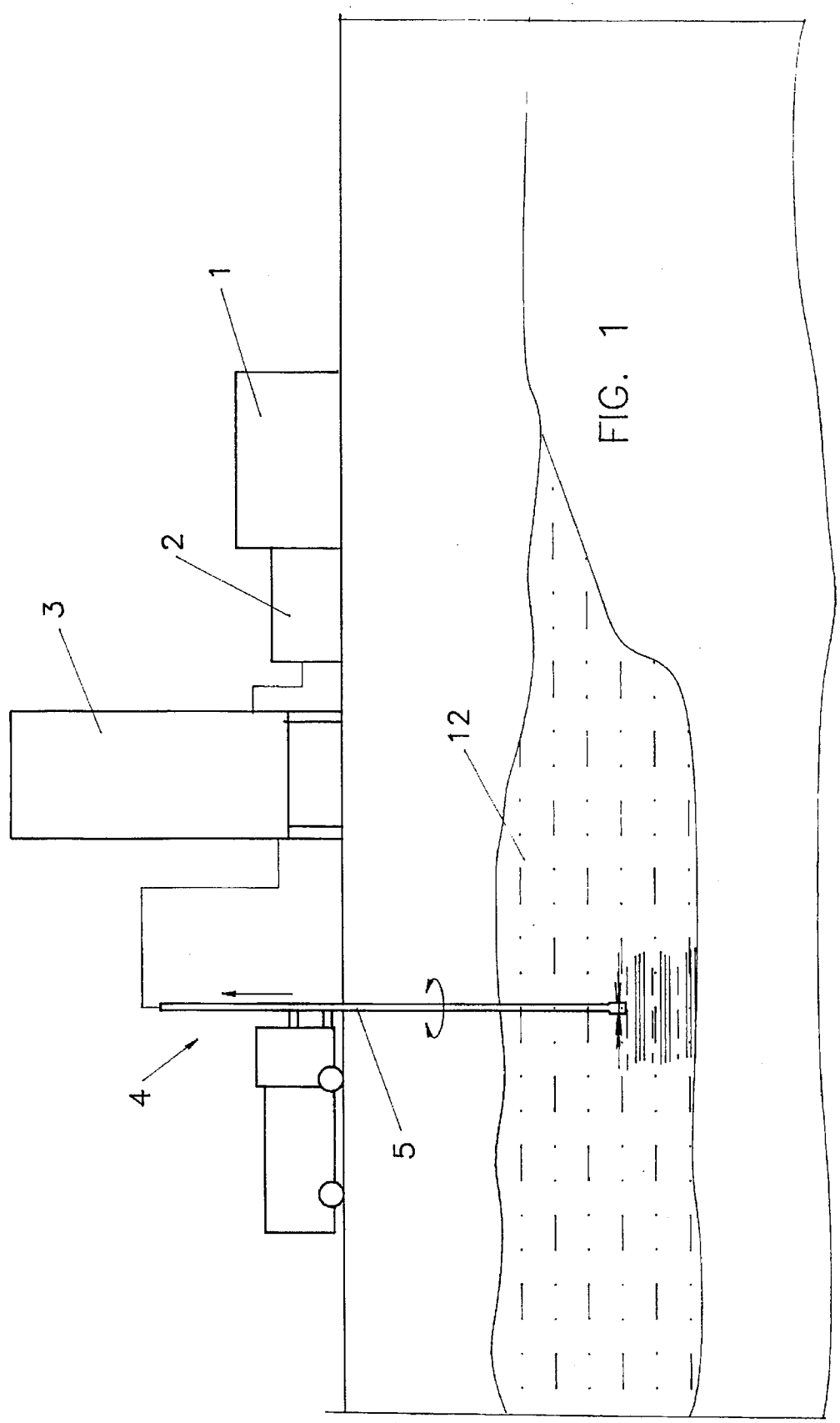
FIG. 1 schematically illustrates the equipment in accordance with the invention during the stage of decontaminating a layer of soil underneath a tip FIG. 2 schematically illustrates a cross-section of a probe for use with the method in accordance with the invention.

By reference to FIG. 1, the equipment required to implement the method in accordance with the invention basically comprises a high-pressure motor pump, shown as no. 1, an air compressor 2, a pressurized silo 3 and downhole equipment 4.

The motor pump can pump a liquid at a pressure of approx. 500 atmospheres along drill rod 5.

Compressor 2 sends a mixture of air and solid substances of suitable particle size along rod 5.

Figure 2:
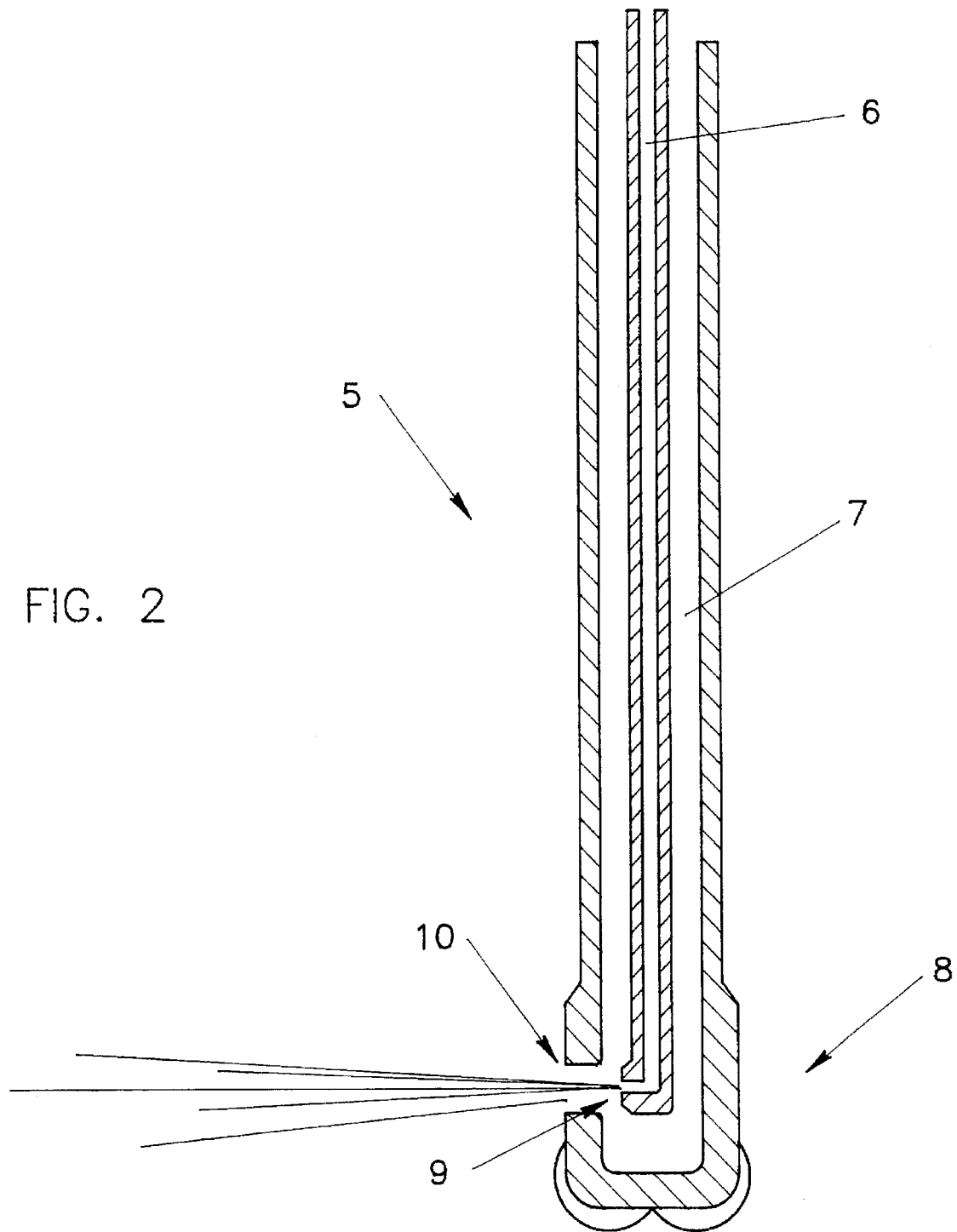

Drill rod 5 (see FIG. 2) preferably consists of two coaxial pipes 6 and 7.

The high-pressure fluid is pumped through inner pipe 6, while the air with the aggregates is pumped through outer pipe 7.

Pipes 6 and 7 have one or more radially directed coaxial nozzles each at bit 8.

These nozzles are shown in the figure as nos. 9 and 10 respectively.

With this system, the high-pressure fluid will exit from nozzle 9 at a very high speed (approx. 200–250 meters/sec), drawing with it a certain mount of air mixed with the solid substance due to the Venturi effect.

The kinetic energy transmitted to the particles of solid matter enables them to disintegrate the soil and mix evenly with it.

Various experiments have established that if the drill rod has a diameter of 90 to 150 mm, and blast furnace ash is used at the rate of 20 kg per cubic meter of air as the solid substance, good results are obtained with solids of a particle size not exceeding 4 mm, and preferably between 2 and 3 mm.

Using this system (FIG. 1), the soil can be drilled down to layer 12 at the required depth; the rod is then rotated, and the fluid and solid substances are simultaneously injected through pipes 6 and 7 to begin the reclamation work.

The speed at which the rod rises and the distance between two adjacent drilling points can be calculated on the basis of the type of soil and the mount of substances to be mixed.

These figures, which obviously vary from case to case, are easily determined by an expert in jet-grouting technology.

The type of fluid and solid materials used depends on the job to be performed.

Thus in order to consolidate soil and regulate its acidity, a mixture of water and cement could be pumped through pipe 6, and air mixed with blast furnace ash directed through pipe 7.

In particular, tests have been conducted on soil used for decades as a tip, which presented a very low density and a pH of 13.4.

By injecting 12 cu.m/min. of air with a content of 20 kg/cu.m. of blast furnace ash, and simultaneously injecting a mixture of water and cement at the rate of 250 liters/min., the pH of the soil was adjusted to 8.1, and a good density obtained at the same time.

For decontamination operations, high-pressure water and air mixed with bacteria could be pumped through the inner and outer pipes respectively.

In particular, a bacterial culture substrate could be injected at high pressure, and the bacteria dispersed in the soil through the low-pressure pipe.

Here again, tests have been conducted with lyophilised "BIO ACTIV BP" bacteria (hydrocarbon degradation bacteria) produced by T.B.A. Techniques et Biotechnologies Appliquees of Paris.

In particular, the bacteria count of soil into which high-pressure water and a current of air in which lyophilised bacteria are dispersed at the rate of 20 kg/cu.m has been tested, to establish the compatibility of the method with the use of bacteria.

In other cases, high-pressure hydrogen peroxide and air mixed with metal sulphides in the outer pipe could be injected to oxygenate the soil.

Basically, the method in accordance with the invention involves the use of techniques similar to the jet-grouting technique to treat deep-lying layers of soil of limited thickness, by injecting a high-pressure fluid and a quantity of solid substances mixed with air at a lower pressure into the soil through a pair of coaxial nozzles, so that the high-pressure fluid draws the air-aggregate mixture with it due to the Venturi effect, dispersing it in the soil layer.

This system produces excellent reclamation results with relatively modest equipment and no need to treat the surface soil, as the injection of the substances can be restricted to the thickness of the soil layer to be treated.

An expert in the field could devise numerous modifications and variations, all of which should be considered to fall within the scope of this invention.

I claim:

1. A soil decontamination method comprising:

providing a drilling rod having an outer pipe with a closed lower end and a radially extending outlet nozzle near the lower end, the outer pipe having an outer surface which is free of outer structures;

providing an inner pipe co-axially positioned in the outer pipe, the inner pipe having a lower closed end with a radially extending nozzle which is co-axial with and spaced inwardly from the nozzle of the outer pipe;

providing a drill bit on an outer surface of the lower end of the outer pipe;

drilling a hole into a layer of soil using the outer pipe and drill bit;

with the outer pipe and drill bit in the hole, supplying a dry mixture of air and solid aggregate particles under relatively low pressure into a space between the outer and inner pipes; and supplying a high pressure fluid into the inner pipe under a relatively high pressure, the high pressure fluid leaving the nozzle of the inner pipe and taking with it some of the dry mixture which passes out of the outer pipe through the nozzle of the outer pipe to disaggregate and mix with decontaminate soil of the layer which is around the hole.

2. A method according to claim 1 wherein the aggregate comprises particles having a particle size from about 2–3 mm.

3. A method according to claim 2 wherein the high pressure fluid is supplied at a rate of about 200–250 meters per second.

4. A method according to claim 3 wherein the outer pipe has a diameter of about 90–150 mm.

5. A method according to claim 4 wherein the aggregate contains blast furnace ash.

6. A method according to claim 5 wherein blast furnace ash is supplied at a rate of about 20 kg per cubic meter of air.

7. A method according to claim 6 wherein the high pressure fluid of the inner pipe is a mixture of water and cement.

8. A method according to claim 1 wherein blast furnace ash is supplied at a rate of about 20 kg per cubic meter of air.

9. A method according to claim 8 wherein the high pressure fluid of the inner pipe is a mixture of water and cement.

10. A method according to claim 9 wherein the aggregate comprises particles having a particle size from about 2–3 mm.

11. A method according to claim 10 wherein the high pressure fluid is supplied at a rate of about 200–250 meters per second.

12. A method according to claim 11 wherein the outer pipe has a diameter of about 90–150 mm.

* * * * *